US012808503B2

(12) United States Patent
Stover

(10) Patent No.: US 12,808,503 B2
(45) Date of Patent: Nov. 24, 2026

(54) SYSTEM, METHOD, AND KIT FOR CONCRETE SURFACE LIGHTING INSTALLATION

(71) Applicant: GLOBAL OUTDOOR LIVING, LLC, Ambler, PA (US)

(72) Inventor: Brian Stover, Perkasie, PA (US)

(73) Assignee: Global Outdoor Living, LLC, Chalfont, PA (US)

( * ) Notice: Subject to any disclaimer, the term of this patent is extended or adjusted under 35 U.S.C. 154(b) by 0 days.

(21) Appl. No.: 18/831,130

(22) Filed: Aug. 5, 2024

(65) Prior Publication Data

US 2026/0036270 A1 Feb. 5, 2026

(51) Int. Cl.
*F21S 8/02* (2006.01)
*F21V 23/00* (2015.01)

(52) U.S. Cl.
CPC ............ *F21S 8/022* (2013.01); *F21V 23/001* (2013.01)

(58) Field of Classification Search
CPC ............................... F21V 23/001; F21S 8/022
See application file for complete search history.

(56) References Cited

U.S. PATENT DOCUMENTS 2,652,168 A * 9/1953 Nelson ..................... B28B 7/32
249/35
2004/0184263 A1* 9/2004 Patti ........................ E01C 17/00
362/145

* cited by examiner

*Primary Examiner* — Evan P Dzierzynski
*Assistant Examiner* — Nathaniel J Lee
(74) *Attorney, Agent, or Firm* — Armand M. Vozzo, Jr.

(57) ABSTRACT

An improved system and associated method are disclosed for installing one or more lighting units on levels of a concrete surface during construction. The present system comprises a mounting fixture assembly for positioning a niche member at the surface of the concrete formation, the niche being formed having a tubular chamber open at one end and pre-fitted with electrical wiring at the opposite closed end with additional length of electrical cabling having a proximal end positioned within the chamber of the niche and a remote end routed through the concrete form to connect to an electrical power source. In mounting the niche within the concrete formation, an insert cap formed having a flat top surface with a surrounding flange and an edge wall projecting below is releasably attached to a form board set along the edge of the intended concrete surface and press-fitted along its projecting wall into the open end of the niche chamber to station and stabilize the pre-wired niche during the concrete pouring and formation. Upon completion of the concrete formation, the form board is removed thereby extracting the cap insert from the open end of the niche and leaving the niche in place with its open end and cabling therein accessible for the connection and installation of the selected lighting unit along the concrete surface. A product kit is further disclosed including a light unit for completing an installation.

18 Claims, 11 Drawing Sheets

SYSTEM, METHOD, AND KIT FOR CONCRETE SURFACE LIGHTING INSTALLATION

FIELD OF THE INVENTION

The present disclosure relates to concrete surface lighting installations, and more specifically, to an improved system, associated method and component kit for pre-staging and completing the installation of lighting units in various locations along the surface of a concrete formation under construction in a reliable and cost-efficient manner.

BACKGROUND OF THE INVENTION

Light installations along concrete surfaces are known to present several challenges. The openings introduced in the concrete are sometimes too large or too small than required and hence require additional cladding to accommodate them.

Further, the holding means for stationing the light elements inside the opening during the concrete formation are often loosely held at the time of pouring making it extremely inefficient and difficult to properly position the lighting. To overcome this, some holding means use threaded connections for better gripping but that has led to deformations of the holding means and misplacements within the concrete formation that create inconsistent and inefficient illumination in clumsy looking lighting designs.

One teaching in the prior art, U.S. Pat. No. 11,635,192, provides an underwater light fixture adapter system that includes a lighting unit having a housing with at least one light positioned within the housing. An adapter has a substantially cylindrical shape with an open interior portion, wherein at least a portion of the housing is positionable within the open interior portion. A connection system is formed between the adapter and the housing of the lighting unit, wherein the connection system secures the housing to the adapter. At least one pivot contact is formed on an exterior surface of the adapter, the at least one pivot contact having a curved surface, wherein the curved surface is contactable to an inner wall of a niche to allow the housing and adapter to pivot. However, the prior art does not address the problems associated with installation of light units in concrete.

Another prior art reference, U.S. Pat. No. 9,835,298, provides an underwater pendant light installation within a wall of a water feature has an installation tube in a niche tube having a facia section at the terminus of the niche tube. One terminus of the niche tube in communication with the water feature and having a water inlet coupled to a water gap section. The underwater pendant or accent light having a housing, a lens body, an electronics section, at least one heat sink, and one or more LEDs is mounted within the niche tube. The underwater pendant or accent light being coupled in a watertight fashion to a power source through the watertight coupling and being contained within the niche tube such that the water gap section surrounds at least in part the housing and permits water from the water feature to circulate in contact the housing but not penetrate into the watertight electrical connection. However, the prior art does not address the problems associated with pre-staging the mounted installation of the lighting during casting of the lighting location inside the concrete. Moreover, when the concrete is being poured within a framed construction to form a cast about the surface location of the lighting, important aspects like the proper location, integrity and durability of the lighting installed, as well as maintaining proper interconnection of components of the lighting units installed are problematic and have not been addressed heretofore by the prior art.

In view of the above references and those problems otherwise unaddressed in the prior art in providing for reliably completing installation of surface lighting along concrete forms during construction, there is a need for an improved system and method for pre-staging the installation of surface lighting along a concrete surface under construction that can obviate the shortcomings associated with the prior art.

Further, limitations and disadvantages of conventional and traditional approaches will become apparent to the one skilled in the art through comparison of the described system with some aspects of the present disclosure, as set forth in the remainder of the present application and with reference to the drawings.

SUMMARY OF THE INVENTION

Accordingly, it is a general purpose and object of the present invention to provide an improved system and associated method for completing lighting installations along the surface of concrete under construction in a reliable and cost-efficient manner.

A more particular object of the present invention is to provide an improved system and associated method of effecting reliable lighting installations in and along concrete surfaces while under formation that is simple and consistent to manage and capable of implementation in a substantially uniform manner.

Another object of the present invention is to provide a system and associated method for pre-staging the installation of surface lighting along a range of surface levels of concrete using standard form boards that define the concrete surfaces.

Still another object of the present invention is to provide a kit of component elements for concrete contractors and others performing concrete construction work that will facilitate the installation of surface lighting in and along the concrete surfaces being formed.

Briefly, these and other objects of the present are accomplished by an improved system and associated method for installing one or more lighting units along a concrete surface during construction. The present system comprises a mounting fixture assembly for positioning a niche sleeve at the surface of the concrete formation, the niche being formed having a tubular chamber open at one end and pre-fitted with electrical wiring at the opposite end otherwise closed with additional length of electrical cabling having a proximal end positioned within the chamber of the niche and a remote end routed through the concrete form to connect to an electrical power source. In mounting the niche within the concrete formation, an insert cap formed having a flat top surface with a surrounding flange and an edge wall projecting below is releasably attached to a form board set along the edge of the intended concrete surface and press-fitted along its projecting wall into the open end of the niche chamber to station and stabilize the pre-wired niche during the concrete pouring and formation. Upon completion of the concrete formation, the form board is removed thereby extracting the cap insert from the open end of the niche and leaving the niche in place with its open end and cabling therein accessible for the connection and installation of the selected lighting unit along the concrete surface.

In one aspect, the present invention provides a system for installing a lighting unit along a concrete surface formed under construction using a form board to frame the surface. The inventive system includes a mounting fixture assembly that includes a longitudinal niche formed having a tubular chamber extending therethrough between a closed end and an open end opposite thereto and an insert cap formed to releasably engage the open end of the chamber. The insert cap is configured for releasably connecting to the form board. The niche is further adapted to be pre-fitted with a length of cabling extending from a remote power source and into the niche chamber through the closed end thereof. The open end of the niche is configured in size and shape to receive the insert cap and its edge wall in friction fit engagement. After the concrete is poured and set with the form board in place, the form board together with the insert cap attached thereto is removed from the open end of the niche, leaving the niche is place with the pre-wired cabling accessible in the chamber for connection to the lighting unit and complete the light installation. The opposite end of the pre-wired cabling is adapted for remote connection In another aspect, the present invention provides a method of installing a lighting unit along a concrete surface formed under construction using a form board to frame the surface. The method includes the steps of positioning a pre-wired cabling inside a niche of a mounting fixture assembly wherein one end of the pre-wired cabling is adapted for remote connection to electrical power for the lighting unit and the other end is positioned inside the niche to provide electrical coupling to the lighting unit. The method further includes the step of securing an insert cap of the mounting fixture assembly to the form board and friction fitting the insert cap to the niche at a niche opening configured to receive the insert cap. The method also includes the step of pouring concrete over a peripheral surface of the niche of the mounting fixture assembly wherein the insert cap fitted to the niche and secured on the form board ensures support and stable mounting of the mounting fixture assembly during concrete construction. The method includes removing the form board to extract the cap insert from the niche, leaving the niche in place with the pre-wired cabling and connecting the pre-wired cabling to the lighting unit having substantially the same contours/cross section as the niche to friction fit the lighting unit inside the niche.

In yet another embodiment, the present invention provides a kit for installing a lighting unit along a concrete surface formed under construction using a form board to frame the surface. In addition to the lighting unit to be installed, the kit includes a mounting fixture assembly including an insert cap and a niche configured to accommodate the insert cap. The insert cap is configured for releasably fastening to the form board, and the niche formed having a tubular body chamber with a pre-wired cabling and an opening configured to receive the insert cap in a friction-fit engagement. The light unit is configured to fit inside the niche and connect to the pre-wired cabling, wherein the formboard may be removed to extract the insert cap after concrete formation on peripheral surface of the niche of the mounting fixture assembly, leaving the niche in place with the pre-wired cabling to connect with the light unit for completing the light installation.

In an advantageous aspect, the axis of the insert cap is aligned with that of the niche such that when the cap is removed after the concrete formation is cast, the niche remains in place and undisturbed inside the cast. Further, the chamber of the niche of the mounting fixture assembly is substantially cylindrical, cubical, spherical, conical or any geometrical shape and the insert cap is configured according to the opening of the niche thereby ensuring alignment of the axis of the insert cap and the niche.

The inventive concepts presented herein are illustrated in a number of different embodiments, each showing one or more concepts, though it should be understood that, in general, the concepts are not mutually exclusive and may be used in combination even when not so illustrated.

To further clarify the advantages and features of the present invention, a more particular description of the invention will be rendered by reference to specific embodiments thereof, which is illustrated in the appended figures. It is appreciated that these figures depict only typical embodiments of the invention and are therefore not to be considered limiting of its scope.

BRIEF DESCRIPTION OF THE DRAWINGS

The above contents of the present invention will become more readily apparent to those ordinarily skilled in the art after reviewing the following detailed description and accompanying drawings, in which.

Figures 1, 1A:
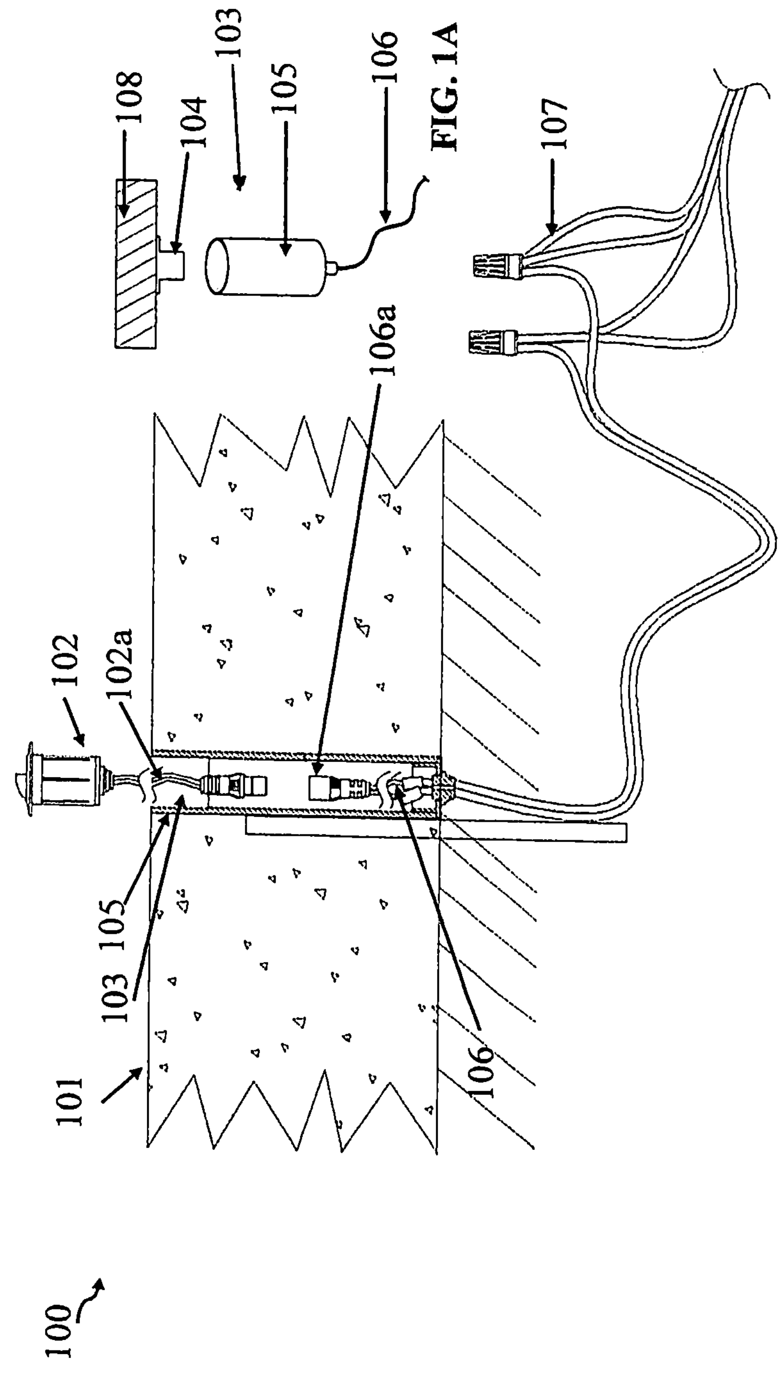
FIG. 1 illustrates the present inventive system for installing a lighting unit along a concrete surface under construction wherein a mounting fixture assembly is employed in accordance with the present invention together with a form board of the type conventionally used to frame the surface.
FIG. 1A shows the separate mounting fixture assembly of the present inventive system readied for attachment to the form board with its associated insert cap and prepared to engage the concrete surface where the lighting installation is intended in accordance with the present invention.

Further, skilled artisans will appreciate that elements in the figures are illustrated for simplicity and may not have been necessarily drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION OF THE INVENTION

The following detailed description and the accompanying drawings referenced herein illustrate the specific exemplary embodiments by which the disclosure may be practiced. These embodiments are described in detail to enable those skilled in the art to practice the invention illustrated in the disclosure. It is to be understood that other embodiments may be utilized, and other changes may be made, without departing from the spirit or scope of the present disclosure. The following detailed description is therefore not to be taken in a limiting sense, and the scope of the present invention disclosure is defined by the appended claims. Embodiments of the claims may, however, be embodied in many different forms and should not be construed as limited to the embodiments set forth herein.

In the following description, various specific details are set forth in order to provide an understanding of and describe the devices and techniques introduced here. However, the techniques may be practiced without the specific details set forth in these examples. Various alternatives, modifications, and/or equivalents will be apparent to those skilled in the art without varying from the spirit of the introduced mechanical components and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as they fall within the scope of the claims, together with all equivalents thereof. Therefore, the description should not be taken as limiting the scope of the invention, which is defined by the claims.

Embodiments of the invention are discussed below with reference to the drawing figures. However, those skilled in the art will readily appreciate that the detailed description given herein with respect to these figures is for explanatory purposes as the invention extends beyond these limited embodiments. For example, it should be appreciated that those skilled in the art, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It should be understood that the present invention is not limited to the particular methodology, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms “a,” “an,” and “the” include the plural reference unless the context clearly dictates otherwise. Thus, for example, a reference to “an element” is a reference to one or more elements and includes equivalents thereof known to those skilled in the art. Similarly, for another example, a reference to “a step” or “a means” is a reference to one or more steps or means and may include sub-steps and subservient means. All conjunctions used are to be understood in the most inclusive sense possible. Thus, the word “or” should be understood as having the definition of a logical “or” rather than that of a logical “exclusive or” unless the context clearly necessitates otherwise. Structures described herein are to be understood also to refer to functional equivalents of such structures. Language that may be construed to express approximation should be so understood unless the context clearly dictates otherwise.

It should be further understood that when an element or layer is referred to as being “on,” “connected to,” or “coupled to” another element or layer, it can be directly on, connected to, or coupled to the other element or layer or intervening elements or layers that may be present. As used herein, the term “and/or” includes any and all combinations of one or more of the associated listed items. Spatially relative terms, such as "cast," or "concrete," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein. References to "one embodiment," "alternate embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an embodiment", "another embodiment," do not necessarily refer to the same embodiment, although they may.

As should be well known to those skilled in the art, here being in the field of concrete construction and lighting, many careful considerations and compromises typically must be made when designing for the optimal manufacture of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach (es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The following serves to describe a preferred embodiment of the present invention and the best presently contemplated modes of its production and practice. This description is further made for the purpose of illustrating the general principles of the invention but should not be taken in a limiting sense, the scope of the invention being best determined by reference to any associated claims.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies.

Generally, the various embodiments of the present invention described herein including the nonlimiting example embodiments relate to a system, method and kit for installing a lighting unit along a concrete surface formed under construction using a form board to frame the surface. Variations of the type, form, size, and material of any of lighting unit components, mounting fixture assembly components or concrete may be made in any of those described previously and used in any of the described embodiments within the knowledge of those skilled in the prior art.

Referring in general to the drawings, the following is a list of those component elements of the present concrete surface installation system, generally designated 100, and those associated elements further shown as employed in connection with the present invention:

- 100 system for concrete surface lighting installation
- 101 concrete surface
- 102 lighting unit
- 102*a* lighting unit cable connector
- 102*b* top surface of the lighting unit
- 102*c* protruded cover partially covering the top surface of the lighting unit
- 103 mounting fixture assembly
- 104 insert cap
- 104*a* hole in top surface of insert cap
- 104*b* flange of insert cap
- 104*c* edge wall of insert cap
- 104*d* protrusions on edge wall
- 105 tubular niche
- 105*b* rectangular niche extension
- 106 pre-wired cabling
- 106*a* electrical connector on pre-wired cabling
- 107 external electrical wiring connections
- 108 form board
- 108*a* mount for the insert cap inside the form board
- 109 casing of the lighting unit
- 110/110*a* holes inside the top surface of rectangular insert cap
- 111 cavity inside edges of the rectangular insert cap
- 112 edge walls of the rectangular cap Referring now to FIGS. 1, an inventive system 100 is shown for pre-staging and completing lighting installations at surface levels of a concrete construction. In accordance with the present invention, the present surface lighting installation system 100 is particularly suited for implementation in connection with the casting and finishing of concrete surfaces typically framed in their formation using form boards and especially useful in and along those concrete surfaces, such as those in and around swimming pools, patios, pathways, and steps where lighted surfaces are most beneficial. In FIG. 1, which depicts a flat surface lighting installation where the present surface lighting installation system 100 may be best employed, a lighting unit 102 equipped with pre-wired cable connector 102*a* is shown in process of being installed within a substantially horizontal concrete surface 101 constructed in form atop a sub-base material and made to accommodate the lighting unit and associated pre-wired connector cabling within a tubular niche 105 mounted in a substantially upright vertical position with the top of the niche substantially level and even with the intended level of the concrete surface. The tubular niche 105 may be supported vertically in this upright position using a rebar member set into the concrete and sub-base material and alongside the niche. The tubular niche 105 is open at one end, wherein in this embodiment of the present surface lighting installation system 100, the open end is atop the niche and is sized and shaped to accommodate insertion of the lighting unit 102 with its pre-wired cable connector 102*a* into the tubular chamber of the niche. The opposite lower end of the niche 105 is substantially closed but pre-fitted and sealed having a mating connector 106*a* and length of associated cabling 106 routed through the bottom end and attached thereto held within the tubular chamber of the niche at its lower end. As best seen in FIG. 1, the pre-fitted cabling 106 from the mating connector 106*a* is extended from the lower end of the niche 105 and routed from the concrete formation to make external electrical wire connections 107 with a conventional power source suitable for operation of the lighting unit 102. The lighting unit 102 is shaped and sized to fit snugly or friction-fit into the open end of the niche 105 and rest in operating position providing illumination at the top of the niche substantially level with the concrete surface 101.

Figure 1B:
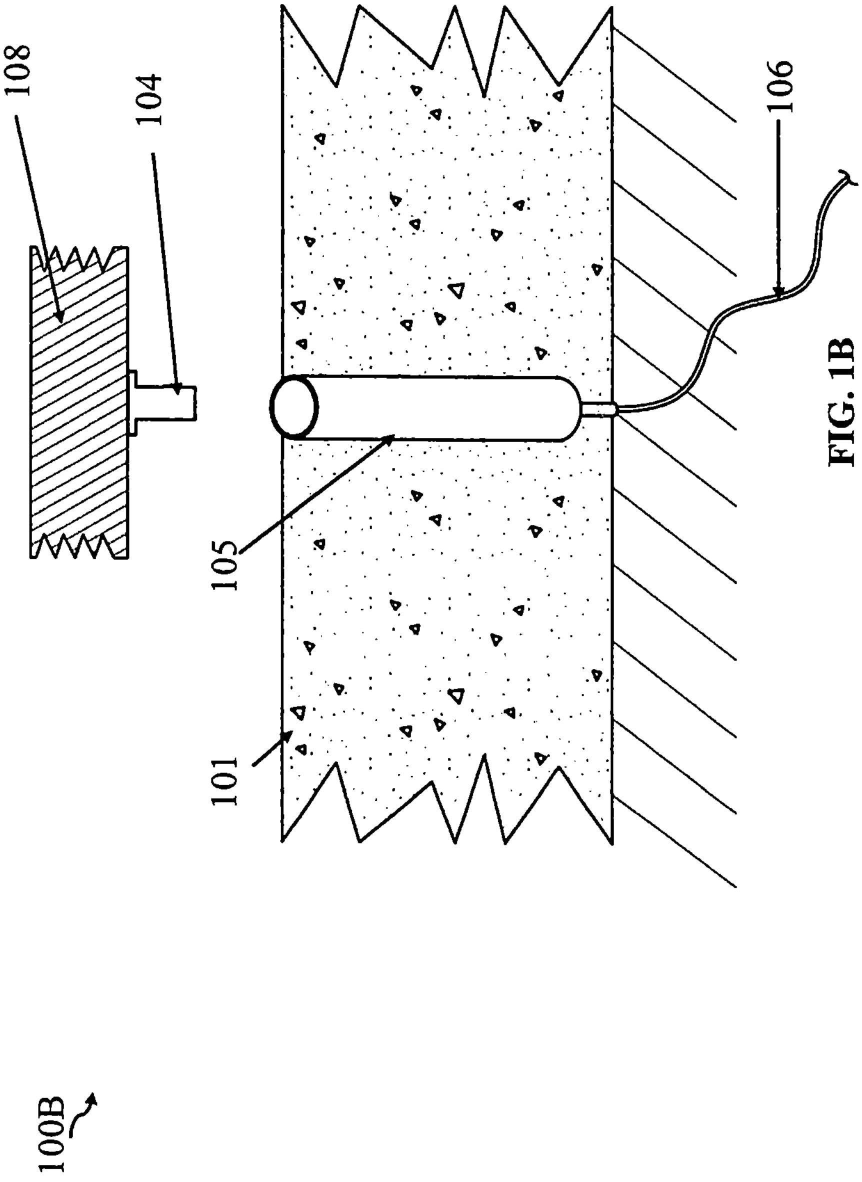
FIG. 1B schematically illustrates the inventive system in a cross-sectional view wherein the mounting fixture assembly of FIG. 1A is partially inside the concrete beneath the surface and the insert cap attached to the form board is outside.
Figure 2:
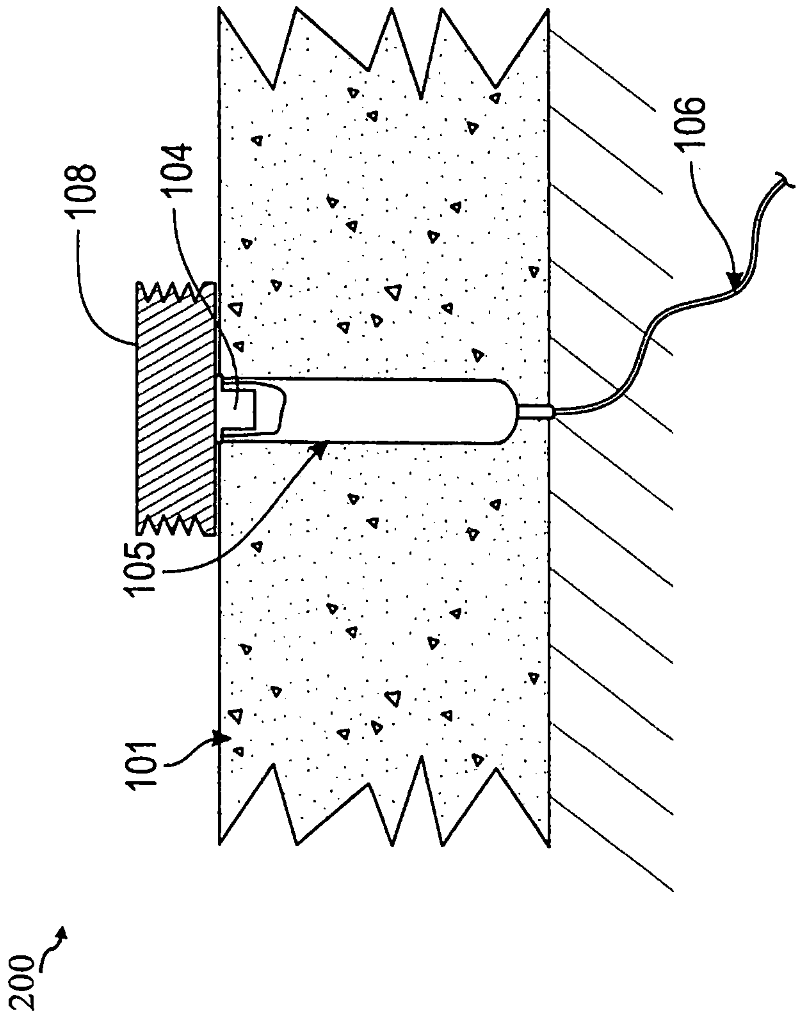
FIG. 2 schematically illustrates the inventive system in a cross-sectional view wherein the mounting fixture assembly of FIG. 1A is fully engaged to the concrete with the insert cap attached to the form board resting upon the concrete surface in accordance with the invention.

Referring now to FIGS. 1A, 1B and FIG. 2, implementation of the present surface lighting installation system 100 involves the use of a conventional form board 108 of the type typically employed in the framing of cast concrete, and further in conjunction with a mounting fixture assembly 103 devised in accordance with the present invention to station the tubular niche 105 together with its pre-fitted cabling 106 and connector 106 inside in the proper upright position with the top of the niche remaining level with the concrete surface 101 during pouring and casting of the concrete. The mounting fixture assembly 103 includes an insert cap 104 adapted to releasably attach to the form board 108 at the top of the cap and further engage below in friction-fit engagement with the open end of the tubular niche 105, best depicted in FIG. 2.

Figure 2B:
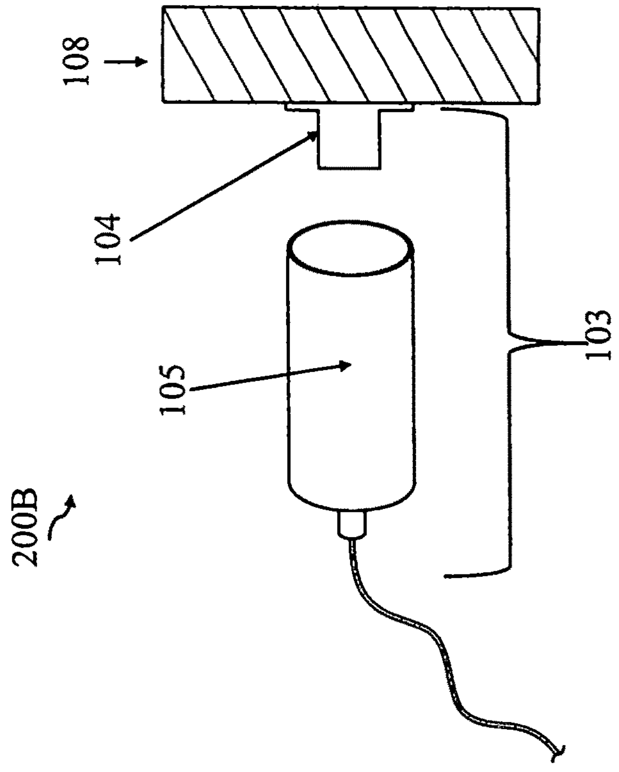
FIG. 2B schematically illustrates an exploded view of the mounting fixture assembly in a horizontal attitude with the insert cap attached to the form board and aligned with the associated tubular niche for light installations on a vertical concrete surface in accordance the present invention.
Figure 2A:
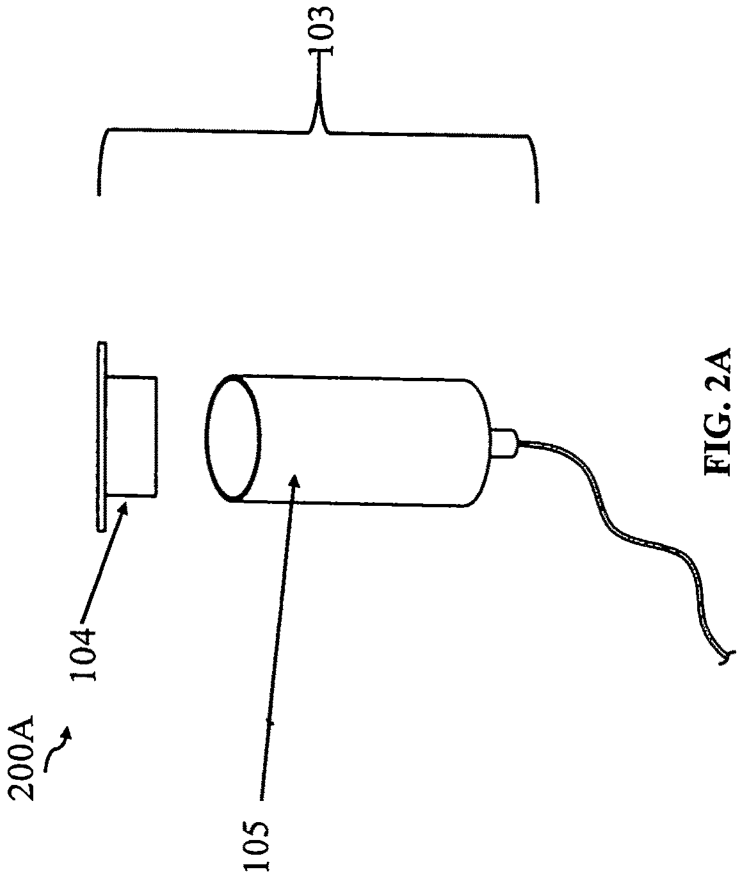
FIG. 2A schematically illustrates an exploded view of the mounting fixture assembly in an upright attitude with the insert cap aligned above with an associated tubular niche below on the same vertical axis for light installations upon a horizontal concrete surface in accordance with the present invention.

Referring to the schematic representations of FIGS. 2A and 2B, the mounting fixture assembly 103 of the present concrete surface lighting system 100 may be employed and implemented in accordance with the present invention in a vertical upright position, as shown in FIG. 1 and depicted in FIG. 2A, to install lighting along horizontal concrete surfaces. The same mounting fixture assembly 103 may also be established and set within a poured concrete formation with the cap insert 104 attached to a form board 108 to provide surface lighting on a vertical surface, such as a step or wall surface, as depicted in FIG. 2A.

Figures 3A, 3B, 3C:
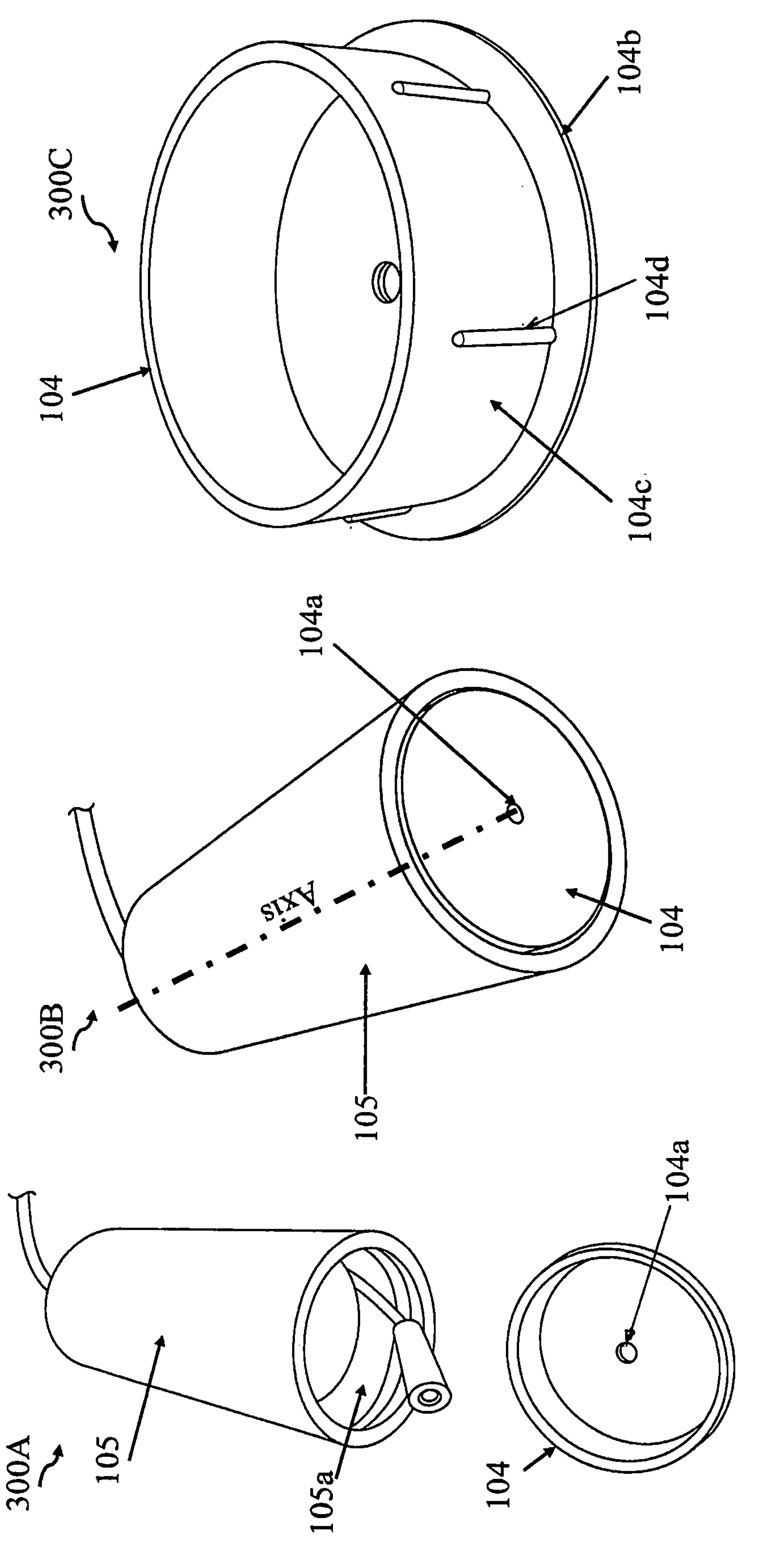
FIG. 3A is an exploded perspective view of the mounting fixture assembly with the insert cap separated from the tubular niche with a pre-wired cabling inside in accordance with an embodiment of the invention.
FIG. 3B shows a perspective view of the mounting fixture assembly in a closed state with the insert cap fully engaged within the open tubular chamber of the niche.
FIG. 3C is a perspective view of the interior side of the insert cap of the mounting fixture assembly.
Figure 4B:
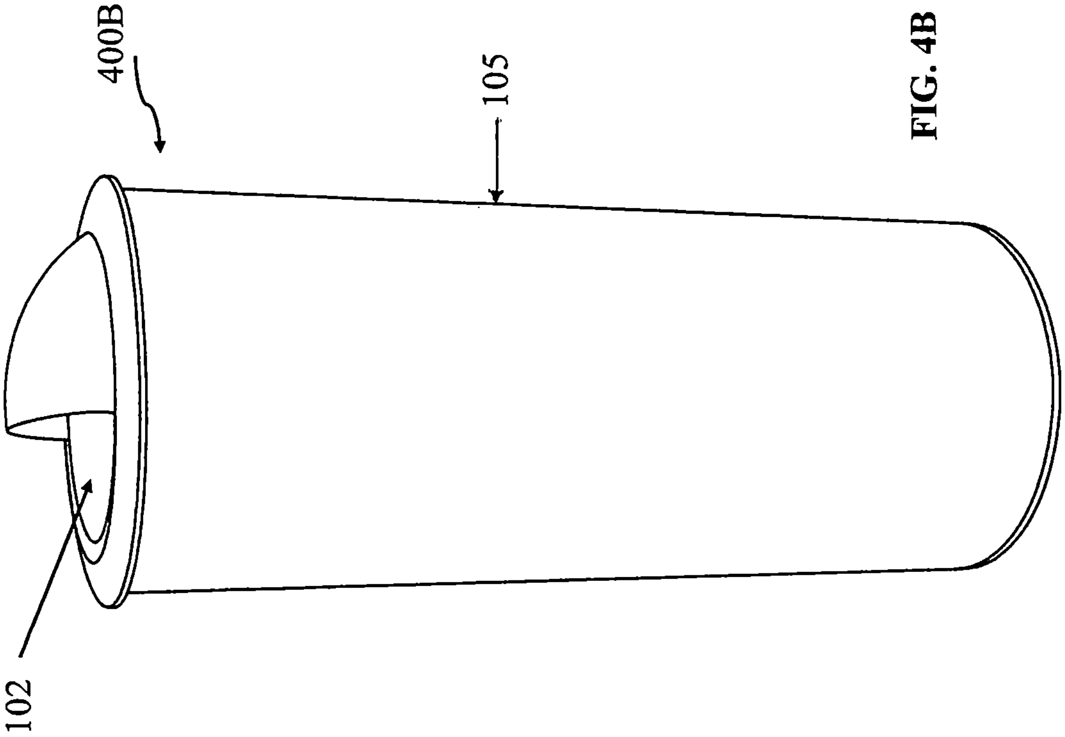
FIG. 4B shows an alternative lighting unit fitted inside the tubular niche of the mounting fixture assembly in the manner intended for installation in accordance with the present invention.
Figure 4A:
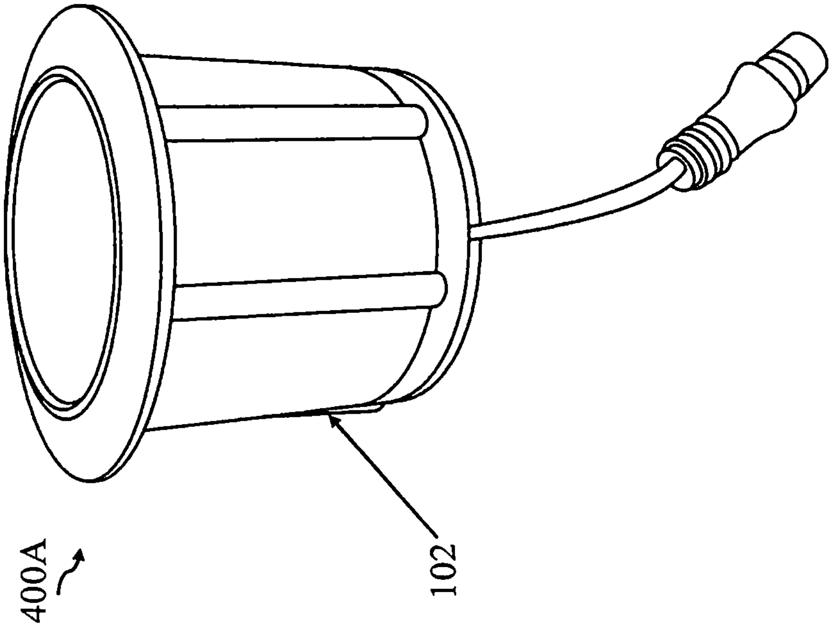
FIG. 4A shows a sample of a lighting unit for installation in accordance with an exemplary embodiment of the invention.
Figure 4D:
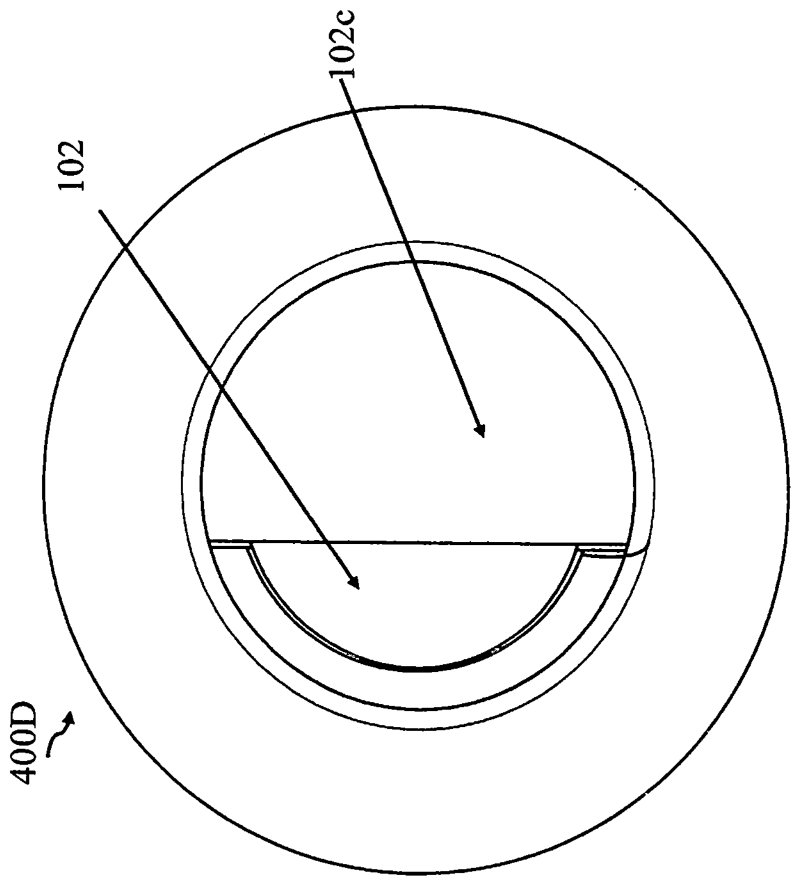
FIG. 4D shows a top view of an alternative type of lighting unit following installation onto a concrete surface in accordance with the present invention.
Figure 4C:
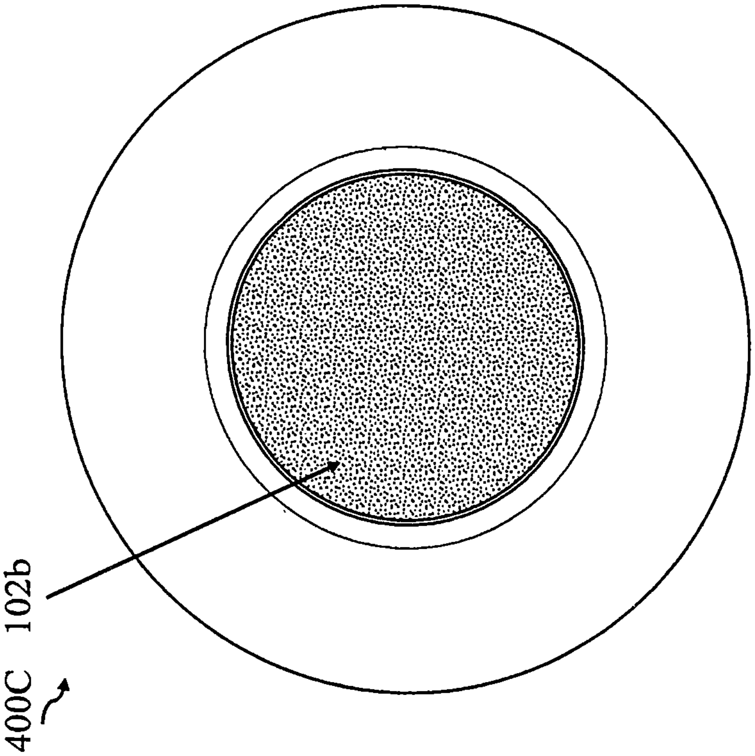
FIG. 4C shows a top view of one type lighting unit after concrete surface installation in accordance with an embodiment of the present invention.

Referring now to FIGS. 3A-3C, insert cap 104 is formed having a flat top surface with central hole 104*a* and a surrounding flange 104*b* around an edge wall 104*c* projecting below with a plurality of rib-like protrusions 104*d* around the edge wall. The top surface of the insert cap 104 is releasably attached to the form board 108 through a screw or other mechanical connection made via the central hole 104*a* while the friction-fit engagement is secured along the edge of the intended concrete surface 101 and press-fitted along its inner edge wall 104*c* into the open end of the niche 105 to station and stabilize the pre-wired niche during the concrete pouring and formation. The insert cap 104 of the mounting assembly 103 is thus attached to the form board 108 securely resting within the top of the stationed niche 105 during concretization. After the concrete is poured and upon completion of the concrete formation, the niche 105 is embedded inside a cavity below the concrete surface 101. Once the concrete solidifies, the form board 108 is removed further extracting the cap insert 104 from the top end of the niche 105 and leaving the niche in place with its open end accessible to inner connector 106*a* and cabling 106 therein accessible for the connection and installation of the selected lighting unit 102 securely engaged and resting within the niche on the concrete surface 101.

In FIG. 3A, the tubular niche 105 is shown with the insert cap 104 separate and apart from the open end 105*a* of the niche exposing the inner electrical connector 106*a* on the pre-wired cabling 106 in the tubular chamber of the niche. In the closed configuration of FIG. 3B, insert cap 104 is shown fully engaged in the open end 105*a* of the tubular niche 105 and covering the niche chamber with its central hole 104*a* in line with the longitudinal axis of the niche, as it would be mounted upon the form board 108 in accordance with the present invention, with the flange 104*b* made to rest upon perimeter edge of the niche and the edge wall 104*c* with its surrounding protrusions 104*d* extending into the niche chamber in friction-fit engagement with the open end of the niche.

The insert cap 104 in its preferred construction form is best viewed in FIG. 3C where the inner edge wall 104*c* and surrounding rib-like protrusions 104*d* project from beneath the top surface of the insert cap, with the flange 104*b* formed around the interior of the top surface of the cap and the central hole 104*a* therein for connecting to form board 108. In this construction form of the insert cap 104, the flange 104*b* and a plurality of protrusions 104*c* on the edge wall 104*c* provide friction fit to the niche 105. The insert cap 104 has a flat top surface with central hole 104*a* so that the insert cap may be intimately secured to the form board 108 and with the edge wall 104*c* projecting below with its surrounding plurality of protrusions 104*d*, the insert cap may be press-fitted into friction-fit engagement with the chamber of the niche 105 through the open end 105*a* thereof to support and stabilize the mounting fixture assembly 103 during the concrete construction. It is important to note that the axis of the insert cap 104 is intended to align with the axis of the niche 105 in the mounting fixture assembly 103 such that when cap 104 is removed after concrete formation, the niche remains in place and undisturbed inside the cast. The axes of the insert cap 104 and the niche 105 thus pass through hole 104*a* and in the connected assembly of the mounting fixture 103, this alignment supports ease of the press-fit engagement of the cap and niche within the mounting fixture prior to casting the concrete and eases their disengagement upon removal of the form board 108 after the concrete hardens without causing damage to niche and the surrounding level of the concrete surface or disturbing the stationed position of the niche for the intended lighting installation.

Alternative types of commercially available lighting units 102 and their respective housings are shown in the respective FIGS. 4A-4D for prospective concrete surface installation, implemented in accordance with the present invention. The lighting units 102 may be varied in form and construction and be housed in short or elongated casings with covers, each configured to be accommodated inside the niche 105 or an extension thereof included in the mounting fixture assembly 103. The housings for the available lighting units 102 will typically include a transparent or translucent top surface 102*b* rimmed by a ring of opaque material without a cover or with a partial protruding cover 102*c* over the top surface.

Figure 5B:
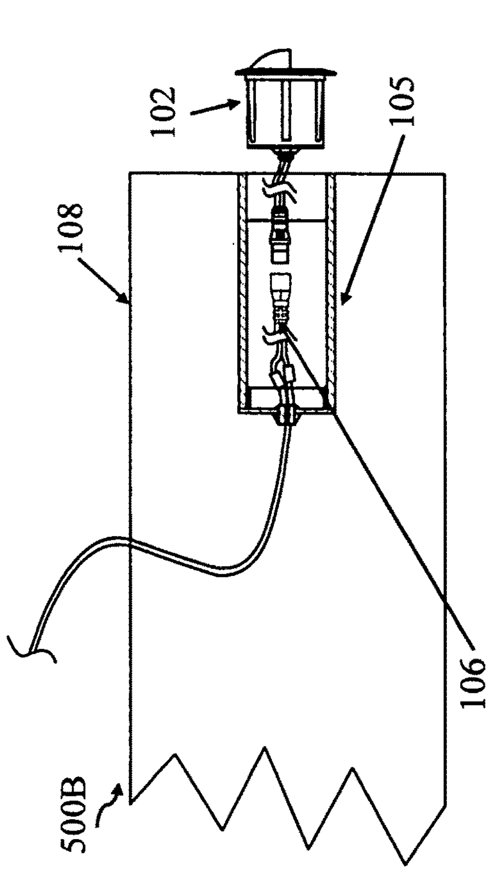
FIG. 5B depicts a cross-sectional side view of the mounting fixture assembly with pre-wired cabling and the tubular niche cast inside the concrete in accordance with an embodiment of the invention.
Figure 5C:
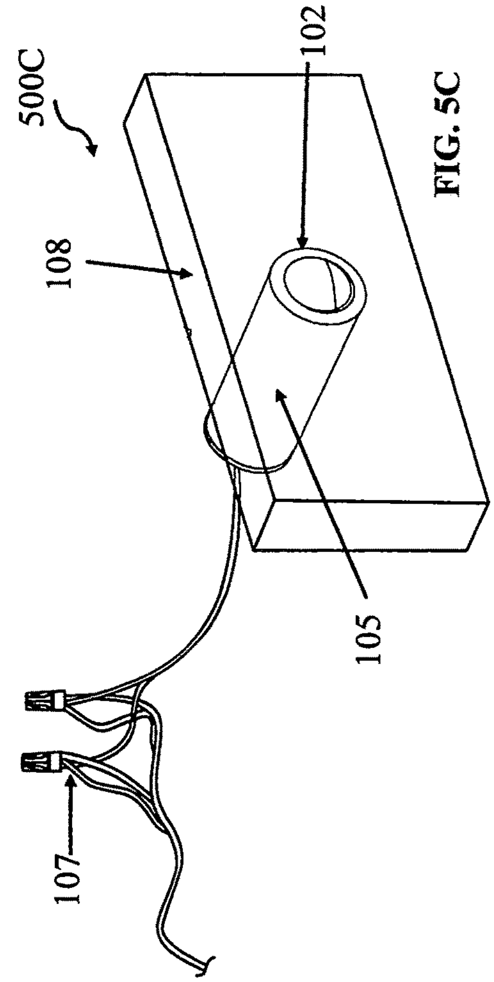
FIG. 5C depicts a perspective view of the mounting fixture assembly with the lighting unit installed at the concrete surface together with outside electrical connection in accordance with an embodiment of the invention.
Figure 5A:
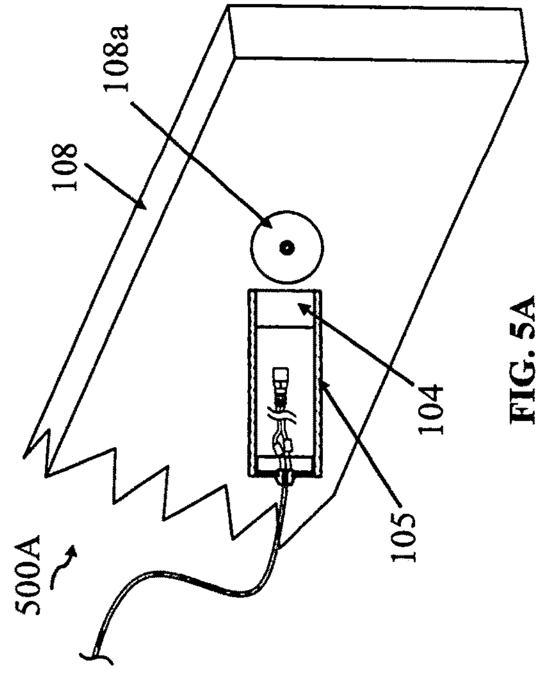
FIG. 5A depicts a perspective view of the mounting fixture assembly connecting horizontally to the form board in accordance with an embodiment of the invention.

In accordance with the present inventive system for concrete surface lighting installation, lighting units 102 may be alternately installed in and upon vertically oriented concrete surfaces such as those of wall facades or the facings of a step riser. In one exemplary case of a step riser installation, as seen depicted in FIGS. 5A-5C, the mounting fixture assembly 103 is assembled and employed in a horizontal attitude in connection with a form board 108*a* that is intended to frame the associated vertical concrete surface wherein the lighting unit 102 is to be installed. In this embodiment of the present invention, a tubular niche 105 pre-fitted with electrical cabling and connector 106 and a modified cap insert 104 intended to keep the plug and cabling in the niche chamber while completing the mounting and casting the concrete. As shown in the perspective view 500A of FIG. 5A, the niche 105 is fitted upon and secured to a mounting flange 108*a* that is attached to the form board 108 where the lighting unit is to be located, and the concrete is poured over the niche in the mounted assembly. After the concrete is formed, the form board 108 together with the mounting flange 108*a* is removed to leave the niche 105 in place and ready for installation of the intended lighting unit 102, as seen in the cross-sectional view of FIG. 5B. The pre-fitted cabling and electrical connector 106 is routed from the niche 105 to the external electrical wiring connections 107, as shown in perspective view 500C of FIG. 5C, to complete the installation of lighting unit 102.

Figure 6:
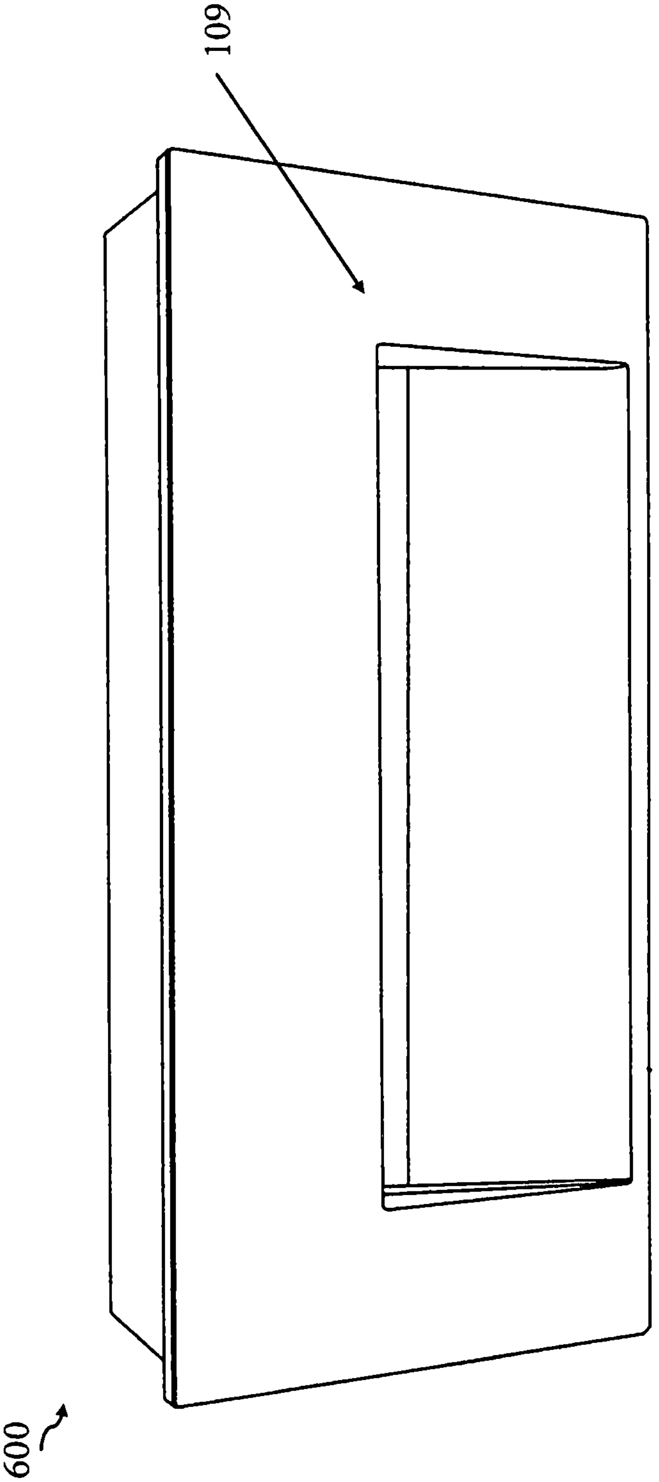
FIG. 6 shows an alternative lighting unit within a front casing designed for a step surface installation in accordance with an example embodiment of the invention.
Figure 7B:
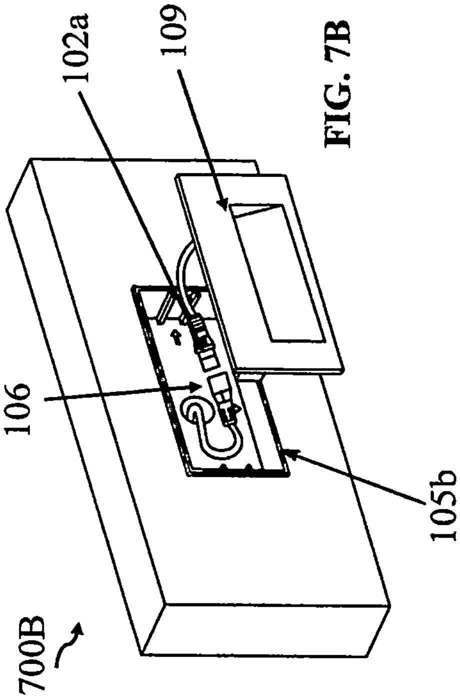
FIG. 7B shows a front view of the lighting unit of FIG. 6 with front casing removed and installed in accordance the present invention.
Figure 7A:
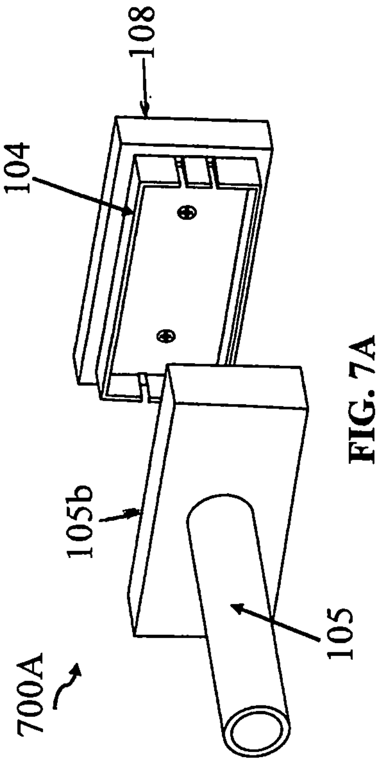
FIG. 7A shows a perspective view of the mounting fixture assembly intended for installation of the lighting unit of FIG. 6 with a rectangular insert cap adapted to fit the tubular niche and connect to a form board through screw connection in accordance with an exemplary embodiment of the invention.
Figure 7C:
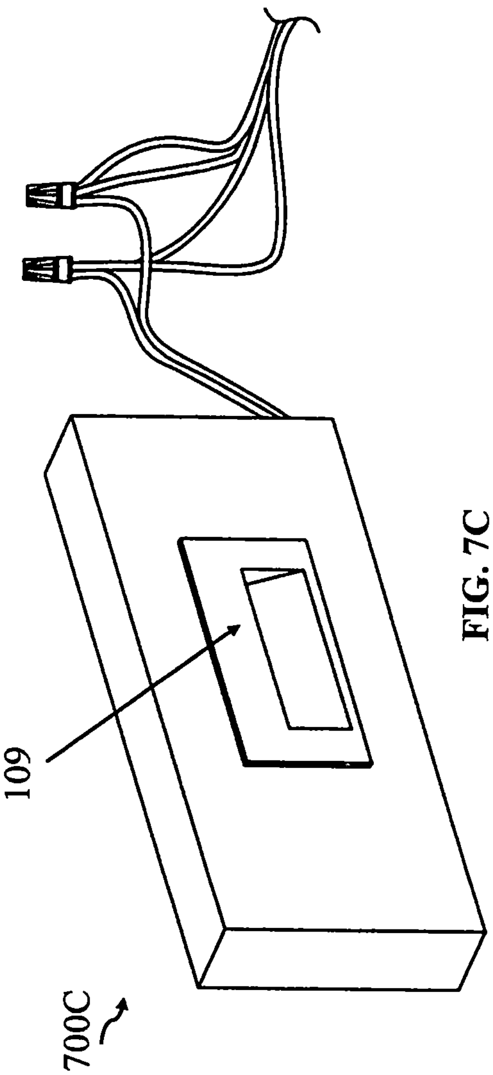
FIG. 7C shows a front view of the lighting unit of FIG. 6 as installed with external electrical connections in accordance with an embodiment of the invention.
Figure 7D:
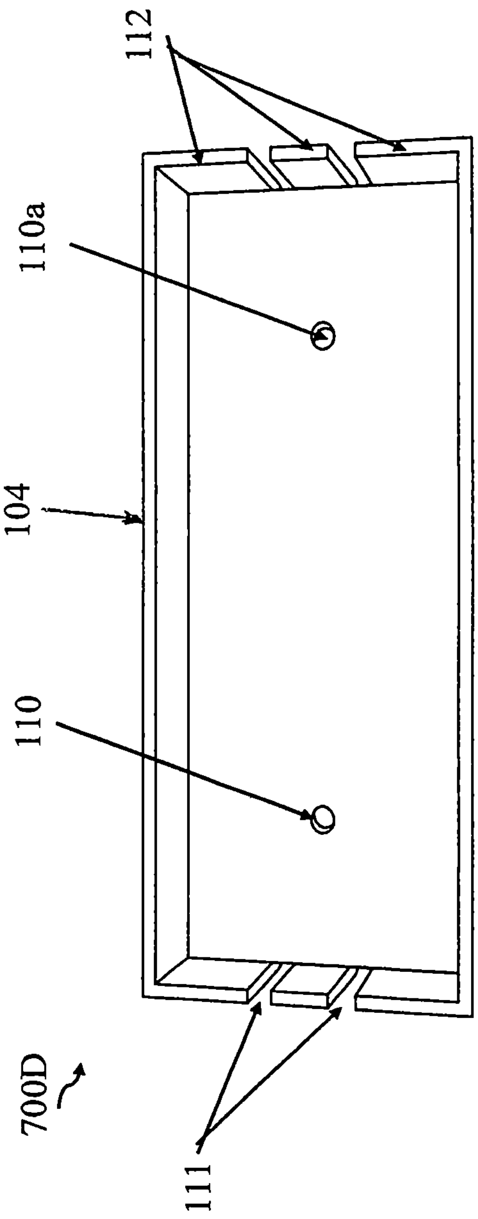
FIG. 7D shows the interior of the rectangular insert cap of the mounting fixture assembly used for installation of the lighting unit of FIG. 6 in accordance with the present invention.

In a further alternative step riser lighting installation where the lighting unit is configured having a rectangular casing 109 as seen in FIG. 6, the present system for concrete surface lighting installation employs a mounting fixture assembly 103 modified to suit and conform with the rectangular configuration of the lighting unit casing. Referring to FIGS. 7A-7D in this regard, FIG. 7A shows a perspective view of the modified form of mounting fixture assembly 103 intended for the installation of the rectangular lighting unit casing 109 of FIG. 6 wherein the modified mounting fixture assembly includes a tubular niche 105 with a rectangular box-like niche extension 105*b* connected to receive the open forward end of the tubular niche, the box-like niche extension being configured in size and shape to match the rectangular lighting unit casing. The box-like niche extension 105*b* thus serves to provide an extended rectangular chamber for the tubular niche 105 and allows the pre-fitted electrical cabling and connector 106 to be held in the rectangular niche extension for access to the lighting unit 109, as better seen in FIG. 7B. A modified rectangular insert cap 104 is further included in this modified form of mounting fixture assembly 103, the rectangular insert cap here being attachable through screw connections to the form board 108 and configured in size and shape to friction-fit within the open end of the box-like niche extension 105*b* and disengage therefrom upon removal of the form board after casting and formation of the concrete surface. As best seen in the perspective view 700D in FIG. 7D, the modified rectangular insert cap 104 is made with two holes 110, 110*a* for screwing engagement to the form board in the modified mounting fixture assembly 103. The insert cap 104 also includes side edges 111 and 112 on opposite sides forming a cavity therebetween for a friction-fit engagement with the box-like rectangular niche extension 105*b* to the niche 105.

Therefore, it is apparent the present invention provides an improved system and associated method for completing lighting installations along the surfaces of concrete under construction, both horizontal and vertically-oriented, in a reliable and cost-efficient manner. The present invention further provides an improved system and associated method of effecting reliable lighting installations in and along concrete surfaces while under formation that is simple and consistent to manage and capable of implementation in a substantially uniform manner. In additions, the present invention provides an effective and reliable system and associated method for pre-staging the installation of surface lighting along a range of surface levels of concrete using standard form boards that define the concrete surfaces. Furthermore, the essential common elements of the present invention provide an improved kit of component elements for concrete contractors and others performing concrete construction work that will facilitate the installation of surface lighting in and along the concrete surfaces being formed.

By way of particular features and variations, the insert cap 104 employed in the mounting fixture assembly 103 may be formed in different sizes and shapes depending on the size and style of the lighting units 102 being installed. The insert cap 104 of the mounting fixture assembly 103 is removably connected to the form board 108 in alignment with the axis of the cap insert and the niche of the mounting fixture assembly. The form board 108 may have more than one means to screw to the insert cap 104 for holding the mounting fixture assembly 108 in place when concrete is poured on the external surface of the niche 105. In an exemplary embodiments, the niche 105 of the mounting assembly 103 may be substantially cylindrical, cubical, spherical, conical or any geometrical shape.

In an advantageous aspect, the system, method and kit for installing a lighting unit having the insert cap with one or more screwing means like a hole can precisely attach to a specific location onto the form board used to form concrete steps, walls and slabs. Depending on the dimensions of the niche, the insert cap is accordingly configured to ensure the axes are aligned thereby providing stability when the concrete is poured on the mounting fixture assembly 103.

In another advantageous aspect, the pre-wired cabling allows for the ease of maintenance to replace the lighting unit if it gets damaged or the light source dies over time, and the tail end of the niche may include a water-resistant gasket with an extended wire to be connected to the power source.

It should be noted and understood that variations of the type, form, size, and material of any of lighting unit components, mounting fixture assembly components or concrete may be of any of those described previously and used in any of the method described.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. Furthermore, certain modifications to the described embodiment that serve to benefit its usage are within the scope of the present invention. Accordingly, it is understood that this invention is not limited to the particular embodiment described, but rather is intended to cover modifications within the spirit and scope of the present invention including the appended claims.

What is claimed is:

1. A light installation system for a concrete surface formed using a conventional form board, comprising:

a mounting fixture assembly comprising a tubular niche having a chamber extending between a closed end and an open end of the tubular niche, wherein the closed end is pre-fitted with electrical cabling extending into the chamber of the tubular niche; and an insert cap configured to releasably engage the form board, the insert cap comprising:

a flat top surface detachably secured to the form board;

a flange extending around the flat top surface; and an edge wall projecting downwardly from the flat top surface and configured for insertion into the open end of the tubular niche, wherein:

the insert cap is configured to be secured to the form board such that the edge wall is press-fit into the open end of the tubular niche, thereby supporting and stabilizing the stationary mounting of the tubular niche during casting of the concrete surface; and upon removal of the form board after the concrete surface is formed, the insert cap is withdrawn from the the tubular niche while the tubular niche remains embedded within the concrete surface with the pre-fitted electrical cabling disposed therein to complete the light installation.

2. The light installation system of claim 1, further comprising: a lighting unit configured to fit into the open end of the chamber of the tubular niche and connect to the electrical cabling disposed therein.

3. The light installation system of claim 2, wherein one end of the pre-fitted electrical cabling is adapted for remote connection to an electrical power source for the lighting unit and the other end is positioned within the chamber of the tubular niche to provide electrical power to the lighting unit.

4. The light installation system of claim 3, wherein the insert cap of the mounting fixture assembly is removed, leaving the tubular niche cast in the concrete surface to allow for the lighting unit to be friction fit into the tubular niche and electrically connected to the pre-fitted electrical cabling disposed within the tubular niche to power the lighting unit.

5. The light installation system of claim 1, wherein the insert cap further comprises a central hole formed through the flat top surface for receiving a mechanical fastener to secure the insert cap to the form board in axial alignment with the open end of the tubular niche when press-fitted therein.

6. The light installation system of claim 1, wherein an axis of the insert cap is aligned with an axis of the tubular niche such that when the insert cap is removed after formation of the concrete surface, the tubular niche remains inside the cast without any rotational movement causing damage to the tubular niche.

7. The light installation system of claim 1, wherein the tubular niche of the mounting fixture assembly has a shape selected from at least one of cylindrical, cubical, spherical, conical or any geometrical shape.

8. The light installation system of claim 1, wherein the edge wall includes a plurality of rib-like protrusions arranged to frictionally engage an interior surface of the tubular niche.

9. A system for installing a lighting unit in a selected location along a concrete surface under construction using a form board to frame the concrete surface, comprising:

a tubular niche positioned in proximity to the concrete surface and having a chamber therein open at one end aligned with the concrete surface and a closed opposite end configured to receive electrical power for the lighting unit within the chamber;

a length of electrical cabling connected to the electrical power source for the lighting unit and fitted to engage the closed end of the tubular niche for delivering the electrical power into the chamber of the tubular niche; and an insert cap adapted to cover the open end of the tubular niche and to be releasably attach to the form board, the insert cap comprising:

a flat top surface;

a flange extending around the flat top surface; and an edge wall projecting downwardly from the flat top surface into the open end of the tubular niche, so that the insert cap may be secured to the form board and press-fitted for releasable engagement within the open end of the chamber of the tubular niche to support and stabilize mounting of the tubular niche during casting of the concrete surface, wherein:

upon completion of the concrete surface formation, the form board is removed to extract the insert cap from the open end of the tubular niche, leaving the tubular niche in place with the pre-fitted electrical cabling disposed therein, the pre-fitted electrical cabling is within the chamber for completing installation of the lighting unit.

10. The system according to claim 9, further comprising: a lighting unit configured to fit into the open end of the chamber of the tubular niche and to connect to the electrical cabling therein.

11. A method of light installation for a concrete surface, comprising the steps of:

positioning a pre-wired cabling within a tubular niche of a mounting fixture assembly, wherein one end of the pre-wired cabling is adapted for remote connection to an electrical power source for a lighting unit and the other end is positioned inside the tubular niche to provide electrical coupling to the lighting unit;

securing an insert cap of the mounting fixture assembly to a form board and press fitting the insert cap into the tubular niche at an opening of the tubular niche configured to receive the insert cap, wherein the insert cap comprising a flat top surface detachably secured to the form board, a flange extending around the flat top surface and an edge wall projecting downwardly from the flat top surface into the open end of the tubular niche;

pouring concrete over a peripheral surface of the tubular niche of the mounting fixture assembly, wherein the insert cap press fitted to the tubular niche and secured on the form board ensures support and stable mounting of the mounting fixture assembly during casting of the concrete surface;

removing the form board to extract the insert cap from the tubular niche, leaving the tubular niche in place with the pre-wired cabling disposed therein; and connecting the pre-wired cabling to the lighting unit having the same cross section as the tubular niche to friction fit the lighting unit inside the tubular niche.

12. The method according to claim 11, wherein the insert cap is fastened on the form board through a central hole formed in the flat top surface of the insert cap so that the insert cap may be positioned on the form board in axial alignment with the open end of the tubular niche when press-fitted therein.

13. A kit for installing a lighting unit in a selected position upon a concrete surface during construction using a form board to frame the surface, comprising:

a tubular niche having a chamber extending between a closed end and an open end of the tubular niche, wherein the closed end is pre-fitted with electrical cabling disposed within the chamber of the tubular niche; and an insert cap comprising:

a flat top surface detachably secured to the form board;

a flange extending around the flat top surface; and an edge wall projecting downwardly from the flat top surface and configured for insertion into the open end of the tubular niche, wherein:

the insert cap is configured to be secured to the form board such that the edge wall is press-fit into the open end of the tubular niche to support and stabilize the stationary mounting of the tubular niche during casting of the concrete surface; and the insert cap is withdrawn from the open end of the tubular niche upon removal of the form board after the concrete surface is formed, leaving the tubular niche in place with the pre-fitted electrical cabling disposed therein to complete the light installation.

14. The light installation kit of claim 13, further comprising: a lighting unit configured to fit into the open end of the chamber of the tubular niche and to connect to the electrical cabling therein.

15. The light installation kit of claim 14, wherein one end of the pre-fitted electrical cabling is adapted for remote connection to an electrical power source for the lighting unit and the other end is positioned within the chamber of the tubular niche to provide electrical coupling to the lighting unit.

16. The light installation kit of claim 13, wherein the axis of the insert cap is aligned with an axis of the tubular niche such that when the insert cap is removed after formation of the concrete surface, the tubular niche remains embedded within the concrete surface and inside the cast any rotational movement for removal of the insert cap causes no damage to the tubular niche.

17. The light installation kit of claim 13, wherein the tubular niche of the mounting fixture assembly has a shape selected from at least one of cylindrical, cubical, spherical, conical or any geometrical shape.

18. The light installation kit of claim 13, wherein the edge wall includes a plurality of rib-like protrusions arranged to frictionally engage an interior surface of the tubular niche.

* * * * *